Jan. 6, 1970

H. E. BARNETT 3,487,829

ORTHOPEDIC SKATE DEVICE FOR CORRECTING
ROTATIONAL LOWER LIMB DEFORMITIES

Filed March 13, 1967

INVENTOR
HARRY E. BARNETT

BY

*Eli Mullin*
ATTORNEY

Jan. 6, 1970  H. E. BARNETT  3,487,829
ORTHOPEDIC SKATE DEVICE FOR CORRECTING
ROTATIONAL LOWER LIMB DEFORMITIES
Filed March 13, 1967  3 Sheets-Sheet 2

INVENTOR
HARRY E. BARNETT
BY
Eli Mullin
ATTORNEY

Jan. 6, 1970  H. E. BARNETT  3,487,829
ORTHOPEDIC SKATE DEVICE FOR CORRECTING
ROTATIONAL LOWER LIMB DEFORMITIES
Filed March 13, 1967  3 Sheets-Sheet 3

INVENTOR
HARRY E. BARNETT

BY
Eli Mullin
ATTORNEY

United States Patent Office 3,487,829
Patented Jan. 6, 1970

3,487,829
ORTHOPEDIC SKATE DEVICE FOR CORRECTING
ROTATIONAL LOWER LIMB DEFORMITIES
Harry E. Barnett, 1040 Lake Shore Drive,
Chicago, Ill. 60611
Filed Mar. 13, 1967, Ser. No. 622,608
Int. Cl. A61f 5/00
U.S. Cl. 128—80                                    10 Claims

ABSTRACT OF THE DISCLOSURE

A device for correcting specific rotational limb deformities having a holding member for each foot positioned in adjustable but predetermined spaced relationship. A tensioning means is selectively located between the holding members to provide the necessary restraining as well as dynamic force for correcting the deformity without immobilizing the movement of the same.

Background of the invention

This invention relates generally to a corrective device for the treatment of limb deformities, and more particularly relates to a device for correcting rotational leg and foot deformities; said device comprising a means for selectively applying a restraining but dynamic force to the limb without immobilizing the same.

Deformities of the limbs may be classified as either congenital or acquired. They may include skeletal defects, defects in muscles and tendons, and defects of the nervous system producing abnormalities of the foot and leg. In addition, acquired defects may also occur including various postural strains on the body.

It is well known that various deformities may be treated by maintaining the afflicted limb in a predetermined immobilized position. In fact, heretofore complete immobilization was often the normal treatment for correcting a rotated deformed limb.

It has been determined, however, that recovery may be considerably accelerated by exercise and freedom of movement of the immobilized limb, since so much of the proper functioning of the foot and limb depends upon the integrity of the musculo-skeletal and nervous systems for balance and movement.

Limb deformites may assume a variety of forms, such as talipes varus or valgus and rotational deformities wherein the affected limb is abnormally positioned. As detailed above, previous treatment of such deformed limbs, particularly among children, often involved some preliminary corrective manipulation after which an uncomfortable and somewhat immobilizing cast or splint was applied to retain the afflicted foot in the improved position and prevent it from returning to the original deformed position. Alternatively, as in the Fillauer night splint a stable brace or device was provided which maintained the foot of the wearer in a predetermined fixed position. The disadvantages inherent in the described prior method of treatment were of course apparent to those skilled in the art, and thus there existed a great need for a new and better method of treating such afflictions.

Summary of the invention

The primary function of this invention is to provide means for correcting rotational deformities of the lower extremities resulting from abnormal intrauterene positions of the extremities or acquired abnormal rotational attitudes resulting from activities such as improper sitting, sitting on thighs with legs rotated, etc. It may be used to treat post-traumatic rotational deformities of the lower extremities and rotational deformities of the lower extremities due to neurological ailments. It may further be used for control of the abduction and rotational positions of the lower extremities following surgery, especially after insection of a hepprostheses for a fractured hip.

The instant invention permits near normal exercise of the patient by providing a pair of substantially foot-shaped holding members having means for innerconnecting the same in fixed but variable spaced-apart relationship. The connecting means consists of at least one metal bar or rod joined to the holding member adjacent the ball of the foot. The connecting member is affixed to the holding member by a universal joint which allows free movement of both holding members within the spaced relationship defined by the rod. As necessary, depending of course on the malady being treated, either a tensioning means is used in combination with the connecting member, or both a tensioning means and another connecting member is used.

If an additional connecting rod is used, it is positioned at the innermost portion of the holding members adjacent the heel of the foot, and it also is pivotally connected by a ball bearing universal joint. The tensioning means, such as a coiled spring, is fastened to one of the connecting points at one end and at the other end affixed in a predetermined position on the other connecting member. If only one connectig rod is used, the tensioning means may be secured in place of the other connecting rod, or it may be affixed diagonally from the unused connecting position to the connecting point on the opposite holding member or directly to the connecting rod itself.

The invention may be adjusted to fit all widths and angles by merely repositioning the connecting member and/or the tensioning means, thereby changing the spacing therebetween and the angle of the holding members. It may also be adjusted by substituting connecting members of different lengths and springs of varying ratings.

All members are connected by either universal joints which permit free vertical and horizontal movement or by the tensioning means which likewise permits free movement of the two holding members. Thus the two holding members may be pivotally and adjustably interconnected to provide individual adjustment for each specific case.

It is therefore an important object of this invention to provide an improved means for treatment of rotational deformities of lower extremities in children which affords freedom of movement and exercise while the deformity is being corrected.

It is another object of this invention to afford easy adjustment of the device as the limb which is being treated, in responding to correction, requires variation of the treatment.

It is another object of this invention to provide a simple fas'ening means by which the holding members may be connected to the shoe of the wearer.

It is still another object of this invention to afford a dynamic rather than rigid splinting which since it permits movement of the limb and exercise, prevents atrophying of muscles resulting from inactivity thereof.

Still another object of this invention is to provide an improved orthopedic splint which is much more comfortable than heretofore and accordingly especially desirable for young children since they experience little or no discomfort.

Still another object of this invention is to afford an orthopedic splint for treating rotational limb deformities without causing secondary deformities at other joints such as frequently occur with rigid splints which maintain the portion of the body not being treated immobile.

Yet another object of this invention is to provide a method of treating rotational limb deformities without materially limiting crawling, standing or walking of the patient.

Still another object of this invention is to afford an orthopedic splint which promotes an increased rate of recovery. It has been found that deformed limbs treated with the Orthopedic Skate are corrected two to three times as fast as previously possible, since the therapy permits near normal motions in the uninvolved limbs.

It is still another object of this invention to provide an improved orthopedic splint which adjusts to all widths and angles.

A still further object of this invention is to afford an orthopedic splint which not only permits normal development of a child's skeletal and muscular system, but also strengthens the muscles while the limb is being corrected because of the resistant type of exercise.

It is a further object of this invention to provide an apparatus for treating rotational limb deformities in children which eliminates the necessity to periodically change the cast. The unit includes a combination of interchangeable springs and rods to cover all angles and widths necessary for children one month to eight years in age. Moreover, a single rod and spring may be repositioned to cover those angles most often used in correcting most rotational lower limb deformities.

It is still another object of this invention to afford a protective member for the sole of the shoe which is smooth and therefore does not tear bed sheets, furniture or tend to destroy household equipment.

It is still another object of this invention to provide a simple and effective fastening means which may be used on different thicknesses of soles and which fits a wide variety of shoes.

Another object of this invention is to afford improved apparatus of the character described which is extremely light in weight and not unattractive in appearance and therefore is not considered objectionable by small children.

It is still another object of this invention to provide readily operable means for adjusting the angle of the foot, i.e., the angles defined by the longitudinal axis or center lines of the feet of a user in a prescribed improved position from which neither foot alone is movable toward its deformed position, or if so movable, will result in extreme tension of the muscles. Thus, the apparatus may be readily progressively adjusted as the correction of the deformity progresses.

Still another object is to afford improved apparatus of the character described which may be simply and quickly attached to the shoe and which when once attached will remain so positioned.

Yet another object is to afford improved apparatus of the character described which enables the patient to move the feet horizontally and vertically to and fro relative to each other in a manner approximating normal movement. Thus, although extreme movement of the deformed foot is somewhat retarded, it is retarded only to the extent necessary to cure the particular ailment being treated.

Yet a further object is to provide improved apparatus of the character described which may be inexpensively fabricated and yet is most efficient for the purposes indicated.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

Brief description of the drawings

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

Description of the preferred embodiment

Figure 1:
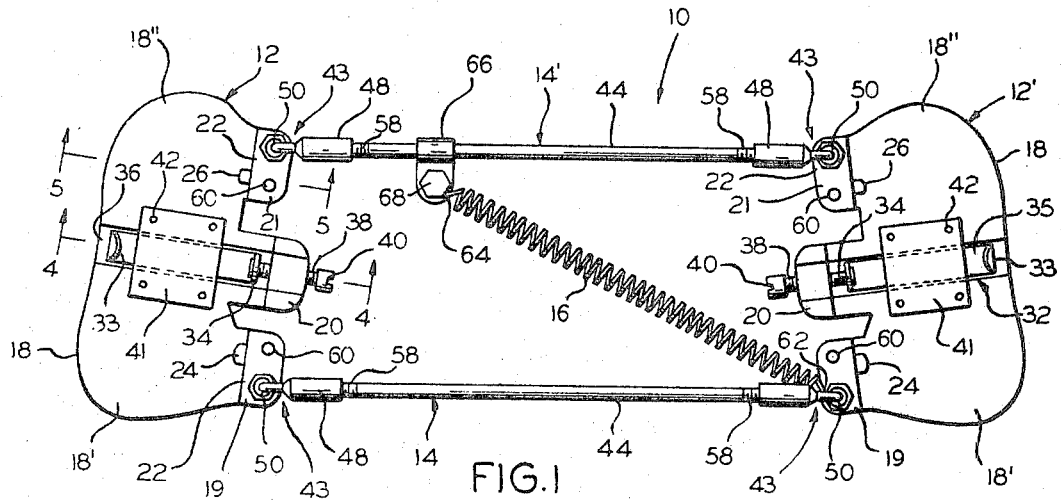
FIG. 1 is a top plan view of the device embodying the principles of the invention.
Figure 2:
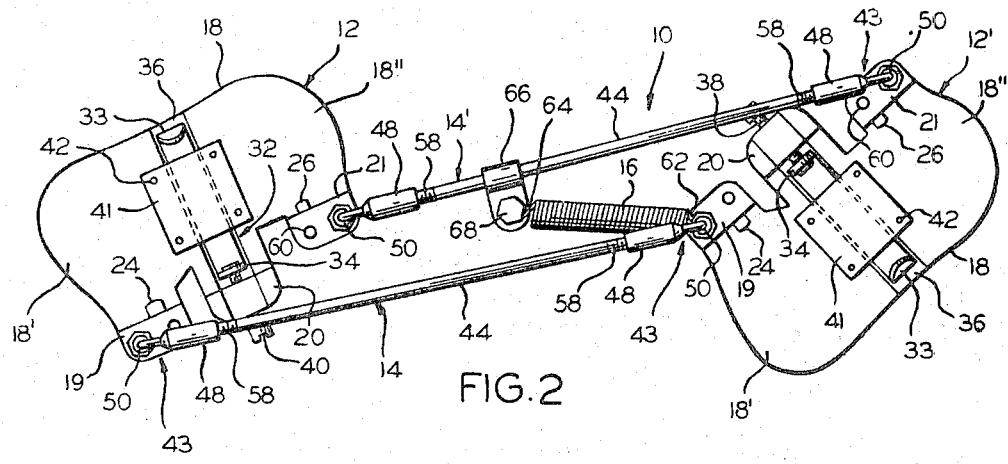
FIG. 2 is another top plan view of the device in FIG. 1 but showing the same in a position of minimum tension.
Figure 3:
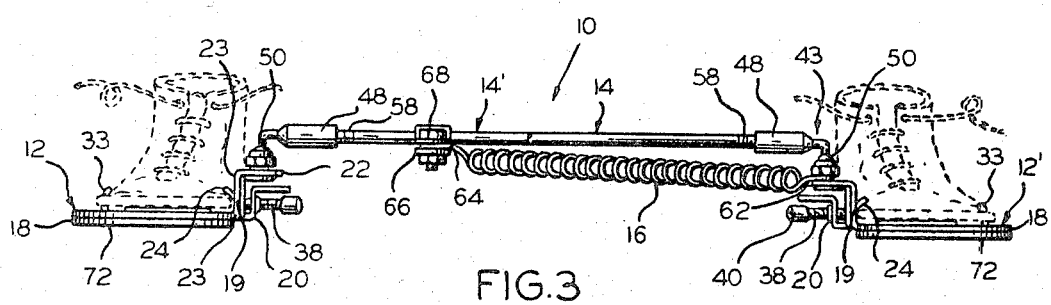
FIG. 3 is a front view of the device in FIG. 1 showing the shoes of the patient in phantom outline and with portions of the front connecting member cut away to show the rear connecting member.

Referring now particularly to FIGS. 1, 2 and 3 of the drawings, reference numeral 10 indicates generally a combination dynamic splint or orthopedic skate device for correcting limb deformities of the foot, embodying the principles of the invention. The splint 10 comprises a pair of holding members 12 and 12' connected in spaced relationship with each other by front and rear connecting members 14, 14'. For some applications of the invention only one connecting member is preferred as will be more fully described later in the description (see FIG. 7). A spring or tensioning means 16 may be selectively disposed in varying positions (see FIGS. 7a–7g) between the holding members 12 and 12' to provide a restraining force against the deformed limb(s).

The holding members 12 and 12' are constructed to accommodate the shoes normally worn by the patient. Thus, each such member comprises a base plate 18 contoured to the shape of the foot. Note that the forward portion 18' of the base plate is wider than the rear portion 18".

A front flange 19, an intermediate flange 20 and a rear flange 21 are integrally formed to the inner edge of each base plate 18. Each flange is bent into a substantially inverted L shape to comprise a horizontal leg 22 spaced above the base plate and a vertical leg 23 formed between the inner edge of the base plate and the horizontal leg.

A front tongue 24 extends inward from the vertical leg 23 of the front flange 19 in spaced relationship with the base plate 18. Similarly, a rear tongue 26 extends inward from the vertical leg 23 of the rear flange 21.

A channel-shaped C clamp member 32 is positioned in base plate 18 and extends transversely thereacross at a point intermediate tongues 24 and 26. The clamp 32 comprises an outer jaw 33 and an inner vertical segment 34 integrally formed at the ends of an intermediate segment 35. The upper end of clamp 33 is bent inwardly for a purpose which will become apparent as the description proceeds. The intermediate segment 35 is nestled for movement in a retaining groove 36 which extends across the width of the support member.

A screw member 38 extends through a threaded aperture 39 in the vertical leg 22 of the intermediate flange 20 with the inner end thereof fixedly attached to the inner end segment 34 of the clamp 32. The outer end of the screw member 38 has a head with a tool engaging notch 40 formed therein. Hence, by rotating the threaded member 38 the C clamp 32 may be moved reciprocably in transverse groove 36 across the base plate 18.

The cooperation of the front tongue 24 and the rear tongue 26 with the C clamp 32 affords adjustable securing means for maintaining the shoe of the patient on the holding members 12, 12' in a substantially immovable position. Thus, with the securing means provided by this invention no special shoes are required. The patient wearing his normal shoes, places his foot on the base plate 18 so that the inner marginal edge of the sole of the shoe is clamped between the base plate 18 and the tongues 24, 26. Then the screw member 38 is rotated to cause the jaw 33 to clamp the outer side edge of the shoe sole. Hence, the shoes with the feet therein are secured in place on the corresponding holding member 12 or 12' between the jaw 33 of the C clamp and the tongues 24, 26. If for any reason a thick soled shoe is necessary for the foot, the jaw 33 and the tongues 24 and 26 will bite into the sole and thereby securely clamp the shoe in position.

To prevent the C clamp 32 from lifting away from the base plate 18, a cover plate 41 is positioned over a portion of the groove 36 thereby retaining the intermediate segment 35 therein. The cover plate 41 may be secured to the base plate by rivets 42.

Figure 6:
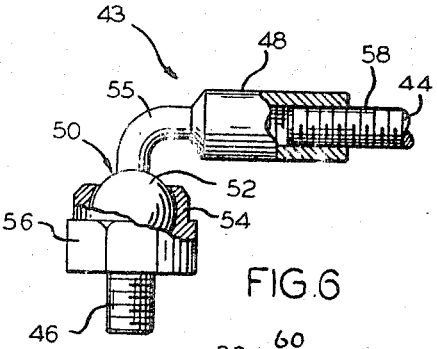
FIG. 6 is an enlarged fragmentary sectional view of the ball bearing universal joint which joins the connecting member to the holding member, with portions broken away to illustrate details of construction.

As above-mentioned, the holding members 12 and 12' are connected together and retained in a predetermined spaced relationship by the front and rear connecting members 14, 14'. Turning now to FIGS. 1 to 6, the relationship of the holding members 12, 12' with the connecting members 14, 14' will be described in detail. Each connecting member comprises a pair of end sections 43 removably attached to the opposite ends of a rod member 44. As shown in FIG. 6, each end section 43 includes an externally threaded outermost end member 46 and an internally threaded hollow tubular portion 48 disposed in planes at right angles to each other. A universal joint indicated generally by reference numeral 50 is interposed between the members 46 and 48.

The universal joint 50 comprises a ball 52 movably retained within a socket 54. An elbow 55 is integrally formed between the ball and the tubular portion 48.

The socket 54 is formed within an hexagonal nut 56 which in turn is formed on the upper end of outer end member 46. Thus, when the nut 56 is rotated with the proper tool, only the socket 54 and the end member 46 rotate in response thereto.

The rod member 44 is externally threaded at each end 58. The rod ends 58 engage with the inner threaded wall of the hollow tube 48 (see FIG. 6). By varying the distance that the rod ends 58 extend inside the tubular portions 48, the length of the connecting member is readily adjusted. Thus, the spacing between the holding members 12, 12' is correspondingly varied and controlled.

A pair of threaded spaced-apart apertures 60, 60' are formed in each of the horizontal legs 22 of the front and rear flanges 19 and 21. The externally threaded outermost ends 46 of the end section 43 are inserted to engage either the innermost apertures 60 or the outermost apertures 60' and are locked in place by the tightening of the corresponding nuts 56. Thus, when the connecting members are operationally positioned, the universal joints 50 permit rotational horizontal and vertical movement of the limbs. Hence, the patient may walk and move in any direction.

Turning again to FIGS. 1 to 3, the spring or tensioning means 16 will now be fully described. As shown, the spring 16 is coiled and of elongated shape. One end 62 of the spring 16 is positioned around the threaded end 46 of the front connecting member 14 and secured on the leg 22 of the front flange 19 of the holding member 12' by the nut 56. Alternatively, of course, the spring end 62 may be secured with a conventional screw engaging either of the other threaded apertures 60, 60' on the same leg of the front flange.

The opposite end 64 of the spring 16 is attached to the rear connecting member 14' by means of a conventional substantially U shaped bracket clamp 66 which slidably encircles the same. Thus, spring end 64 is looped around a screw 68 which extends through aligned apertures (not shown), one or more of which may be threaded. The tightening of the screw 66 secures the spring to the clamp 66 and simultaneously locks the clamp at the preselected position on the rear connecting member 14'.

The positioning of the clamp 66 along the rod 14' comprises the means for adjusting the position and tension of the spring 16. The determining factor is, of course, the magnitude of the tension or restraining force required for the treatment of the patient. Thus, for example, if more tension is required, the spring may be stretched to a greater length and secured to the connecting member at a point closer to the opposite holding member 12. Conversely, if less tension is needed, the spring is contracted and attached to the connecting member at a point further from the opposite holding member 12.

A protective layer of neolite leather or the like 72 may be cemented, glued or otherwise attached to the bottom surface of the base plate 18.

Referring to FIG. 2, it will be noted that the skate is so positioned that the spring 16 is not under tension. Thus, in this position, the patient may move his limbs up and down freely, restricted only by the predetermining positioning of his feet. Horizontal rotational movement of the limbs changes the angle, such as in FIG. 1, and places the spring under tension.

Figure 7A:
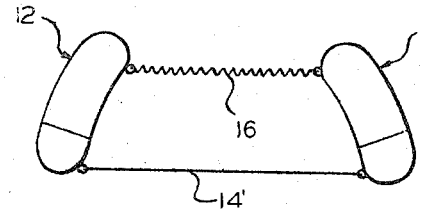
FIGS. 7a–7g are diagrammatic illustrations of the various positions in which different length connecting means and tensioning means may be positioned to achieve maximum results for various types of leg deformities.
Figure 7B:
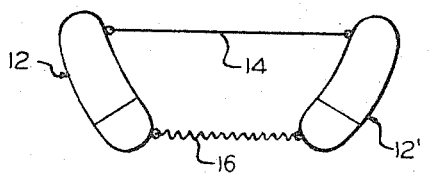
Figure 4:
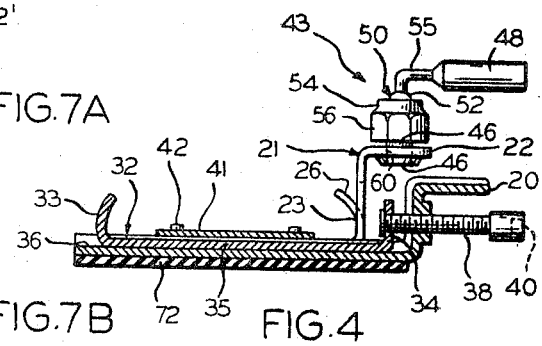
FIG. 4 is an enlarged sectional view taken on the plane of line 4—4 in FIG. 1 and viewed in the direction indicated.
Figure 7C:
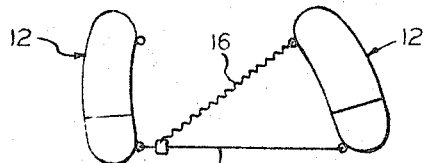
Figure 7D:
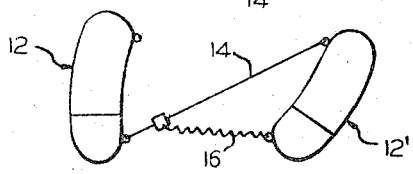
Figure 5:
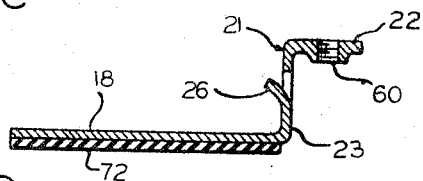
FIG. 5 is an enlarged sectional view taken on the plane of line 5—5 in FIG. 1 and viewed in the direction indicated.
Figure 7E:
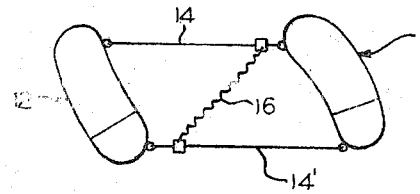
Figure 7F:
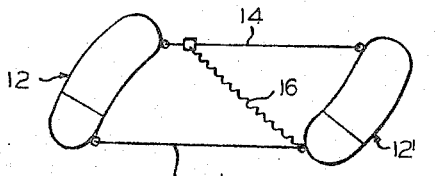
Figure 7G:
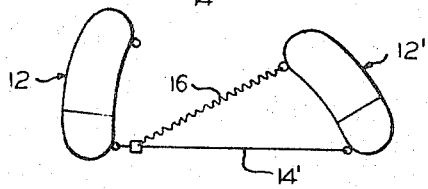
Figure 8:
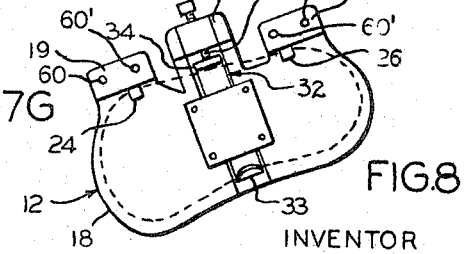
FIG. 8 is a top plan view of a holding member showing the shoe of the patient in phantom outline securely clamped in place.

Although the orthopedic skate device 10 has been described in a particular configuration as shown in FIGS. 1 to 3, the complete adjustability of the parts comprising the device affords means for readily varying the same. Thus FIGS. 7a–7g illustrate in schematic form the various positions in which the spring tensioning means and/or the connecting members may be positioned to treat a wide variety of limb deformities. FIGS. 7a and 7c illustrate the combination and positioning of the members of the orthopedic splint to treat internal rotational deformities. FIGS. 7b and 7d illustrate the combination and positioning of the various members to treat external rotational cases. FIGS. 7e and 7f show the combination and positioning of the members to treat internal rotation of one leg and external rotation of the other leg. FIG. 7g shows how the support members and the rods and tensioning means may be used to treat rotational deformities associated with metatarsus valgus or varus. It should be noted that gradual but relatively rapid correction of the deformities may be achieved by changing the length of the connecting members or spring in accordance with the progress of the therapy, or preferably by merely changing the relative positions of the spring and connecting member as illustrated in FIGS. 9, 10 and 11 of the drawings.

Figure 9:
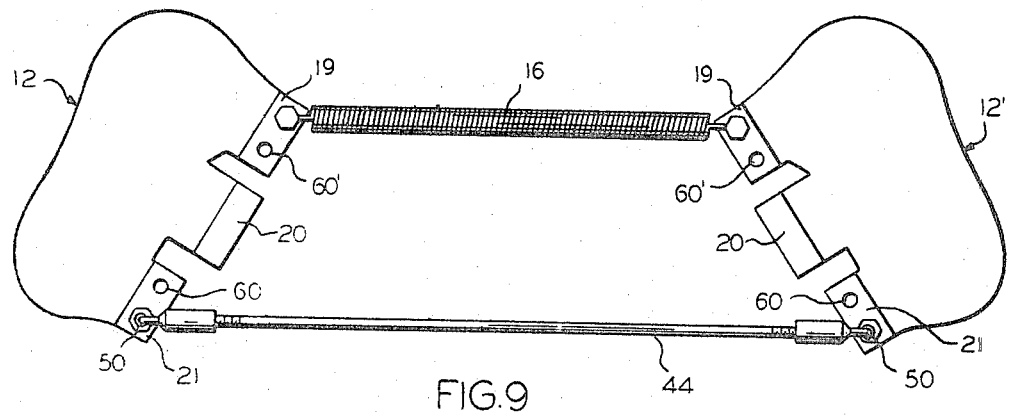
FIG. 9 is a top plan view, with parts removed to facilitate illustration, showing members of the device so positioned as to produce a foot-positioning angle of 30°.
Figure 10:
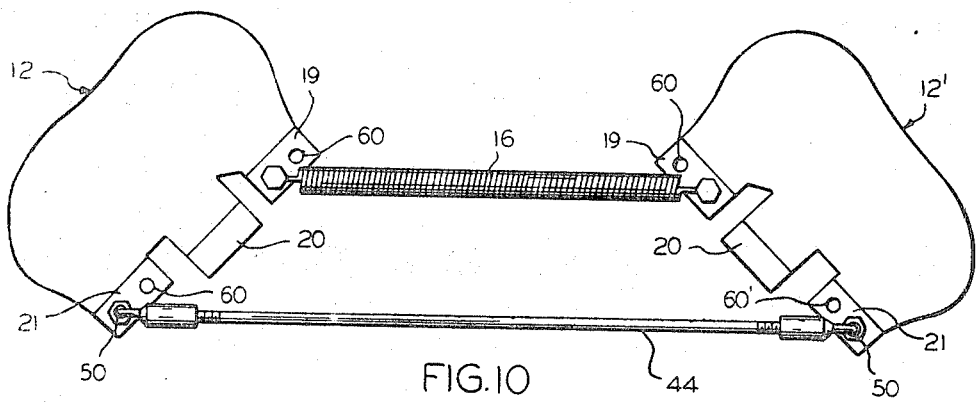
FIG. 10 is a similar view but with the same members positioned to produce an angle of 45°.
Figure 11:
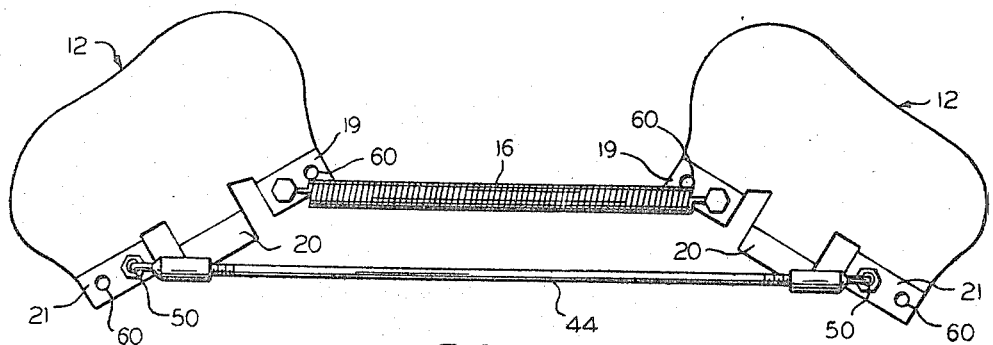
FIG. 11 is another similar view but with the same members positioned to produce an angle of 60°.

Referring to FIGS. 9, 10 and 11, it will be noted that to achieve a desired prescription angle of 30° a single connecting member 14 or 14' and a single spring 16 may be employed with the ends thereof positioned in the apertures 60 or 60' as shown in FIG. 9 of the drawings. By merely repositioning the connecting member 14 and/or spring 16 the spacing between the connecting member and the spring is changed resulting in a change of the angle of the holding members 12, 12'. FIG. 10 illustrates the connecting member and spring positioned to produce an angle of 45° and FIG. 11 shows an angle of 60°. Since these three angles (30°, 45° and 60°) are sufficient for most purposes, a device with a single connecting member 14 and single spring 16 is all that need be employed in most cases.

Bearing in mind that the connecting members may be either interchanged or merely repositioned as necessary to treat a variety of limb deformities whether it be "toe-in," "toe-out," or a combination of the same, and that the tensioning means can be easily adjusted to accomplish the same result, the operation of the apparatus is easily understood. In particular it should be remembered that since in infancy and the younger years deformities are usually produced by soft tissue contractures, stretching of these members may be begun as soon after birth as one week and may be continued until complete correction is obtained and the limb is responding to treatment. The operation is most readily understood with particular reference to FIGS. 7a–7g of the drawings. As previously indicated in these diagrams, the apparatus has been adjustably set in a variety of positions to provide desired prescription angles for treatment of various limb rotational problems. For example, in FIG. 7a the apparatus has been set to provide a desired prescription angle (the ball inward from the heel of the foot) for the treatment of the out-toeing condition. It will thus be noted that one connecting member is attached at the heel of the foot to maintain the heels in predetermined spaced relationship. The tensioning means is affixed adjacent the ball of the foot. Although the apparatus permits the patient freedom of movement of his feet in both horizontal and vertical planes, the prescription angle cannot be altered except by adjustment by the physician or therapist. Any tendency or attempt by the patient to change the relative position of the ball and heel of the foot is resisted by the device so that the limb is further strengthened and therapy accelerated. In other words, the position shown in FIG. 7a is the improved prescription position beyond which the shoes cannot be moved back towards the original deformed position. However, the shoes are nevertheless free to rotate within a normal range of movement in any direction opposite from the deformed position. Similarly the freedom of rotation of the connecting members about either of the ball bearing joints permits the patient to move either leg forwardly or rearwardly in a walking, crawling or similar motion.

For purposes of treating in-toeing deformities, it is simply necessary to adjust the relative position of the connecting member and of the tensioning means so that they are in effect reversed from that shown in FIG. 7a. Such adjustment may be readily accomplished by unscrewing the rods and repositioning them as desired. The operation of the apparatus in treating the in-toeing condition is of course the same except that in this case inward movement of the feet is limited by the positioning member whereas outward movement of the feet away from each other is limited only by the tensioning means. To treat other limb deformities the various combinations may be adjusted to produce the correct position and tension.

From the foregoing description and drawings, it should be apparent that I have provided a novel and most efficient improved apparatus for treating rotational limb deformities in children. The apparatus is light in weight and may be quickly and simply adjusted to treat many types of limb deformities and to vary the prescribed treatment easily.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. An orthopedic skate for treating deformed limbs; comprising clamp means for readily and removably associating said skate with said limbs, connecting means associated with said first mentioned means for spacing said limbs apart, tensioning means associated with said first mentioned means to apply a restraining force to at least one of said limbs for treating the same, said connecting means including means for varying the spacing between the limbs, and adjustment means associated with said connecting means and said tensioning means for selectively varying the tension and thereby controlling said treatment.

2. The orthopedic skate of claim 1, wherein said connecting means is pivotally associated with said limbs to enable horizontal rotational and vertical movement of the limbs.

3. The skate of claim 1, wherein the means for associating the skate with the limbs comprises a first holding member and a second holding member, each of said holding members including securing means for securing said skate to the shoes of the patient; and said connecting means comprises at least one rod member pivotally associated with said holding members, said rod member maintaining said holding members in a predetermined spaced relationship but yet permitting movement of the same.

4. The skate of claim 3, wherein:
said tensioning means comprises a spring member interconnecting said holding members.

5. The skate of claim 4, wherein:
said spring member is connected at one end to one of said holding members, the opposite end of said spring member being slidably associated with said rod member for selective attachment thereto.

6. The skate of claim 1, wherein said connecting means comprises at least one rod member, said rod member comprising a rod and a pair of end sections theadedly connected to opposite ends thereof, the connection of the end sections with the rod being adjustable to enable the length of the connecting means to be varied thereby varying the spacing between the limbs.

7. The skate of claim 5, wherein:
a clamp member is slidably positioned around the rod member, said opposite end of the spring member being associated with said clamp member; and means for locking said clamp member at a preselected point on said rod member and simultaneously securing said opposite end of the spring member to the clamp.

8. The skate of claim 3, wherein:
each of said holding members includes a base plate formed substantially to the contour of the foot and supporting the shoe of the patient, said securing means comprising a front tongue, a rear tongue and a movable clamping means, said front and rear tongues being spaced above portions of the base plate adjacent one of the side edges thereof and spaced from each other, said clamping means associated with the base plate and extending transversely thereacross at a point intermediate the tongues, said clamping means including a jaw member positioned adjacent the opposite side edge of the base plate, said clamping means securing the shoe on the base plate by causing one side edge of the sole of the shoe to be clamped between the jaw and the base plate and the other side edge thereof to be clamped between the tongues and the base plate.

9. The skate of claim 6, wherein each of the end sections of said connecting member comprises:
an externally threaded outermost end member and an internally threaded hollow tubular inner end member disposed in planes at substantially right angles to each other, said hollow tubular member engaging with one of the ends of the rod of said rod member, said outermost end member being connected with one of said holding members to operatively associate said rod member therewith; and
a universal joint interposed between the end members of the corresponding end section to enable horizontal rotational and vertical movement of the limbs.

10. The skate of claim 8, wherein:
a front flange and a rear flange are formed to the inner edge of each of the base plates and extend upward therefrom, said flanges being substantially inverted L shaped, each of said flanges comprising a horizontal leg extending outwardly from the base plate and in spaced relationship therewith, and a vertical leg formed to the base plate and the horizontal leg, said front flange and ear flange being spaced apart from each other whereby said front flange is adjacent the front of the base plate and the rear flange is adjacent the back end thereof; and
said horizontal legs having a plurality of means for operatievly associating the holding members with said rod member and said spring member in variable spaced relationship one with the other.

References Cited

UNITED STATES PATENTS

| | | | |
|---|---|---|---|
| 2,514,870 | 7/1950 | Israel | 128—80 |
| 2,815,021 | 12/1957 | Freeman | 128—80 |
| 2,963,020 | 12/1960 | Moran | 128—80 |

OTHER REFERENCES

Orthopedic Appliances Catalogue, 1952, pp. 485–493, RD755 Q75C2.

RICHARD A. GAUDET, Primary Examiner

JOHN D. YASKO, Assistant Examiner

U.S. Cl. X.R.

272—57

UNITED STATES PATENT OFFICE
CERTIFICATE OF CORRECTION

Pat. No. 3,487,829                                January 6, 1970

Harry E. Barnett

It is certified that error appears in the above-identified patent and that said Letters Patent is hereby corrected as shown below:

In Column 1, line 46, "deformites" should be --deformities--;
in Column 8, line 45, "theadedly" should be --threadedly--;
in Column 9, line 22, "ear" should be --rear--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents